(12) United States Patent
Peterman et al.

(10) Patent No.: US 8,070,956 B2
(45) Date of Patent: Dec. 6, 2011

(54) METHOD OF SEPARATION OF POLYMERS

(75) Inventors: Mark Peterman, Fremont, CA (US); Jaan Noolandi, Mountain View, CA (US)

(73) Assignee: OndaVia, Inc., Fremont, CA (US)

( * ) Notice: Subject to any disclaimer, the term of this patent is extended or adjusted under 35 U.S.C. 154(b) by 21 days.

(21) Appl. No.: 12/082,094

(22) Filed: Apr. 7, 2008

(65) Prior Publication Data

US 2008/0257811 A1    Oct. 23, 2008

Related U.S. Application Data

(60) Provisional application No. 60/912,681, filed on Apr. 18, 2007.

(51) Int. Cl.
*B01D 15/08* (2006.01)
*B01D 57/02* (2006.01)
*C02F 1/28* (2006.01)

(52) U.S. Cl. ............. 210/656; 210/198.2; 204/450

(58) Field of Classification Search ........... 210/198.2, 210/656; 204/450, 451, 454, 542, 600
See application file for complete search history.

(56) References Cited

U.S. PATENT DOCUMENTS

| | | | | |
|---|---|---|---|---|
| 4,291,096 A | * | 9/1981 | Taylor | 428/398 |
| 4,551,251 A | * | 11/1985 | Kolobow et al. | 210/635 |
| 4,753,546 A | | 6/1988 | Witz et al. | |
| 5,571,410 A | * | 11/1996 | Swedberg et al. | 210/198.2 |
| 5,593,565 A | * | 1/1997 | Ajdari et al. | 204/643 |
| 5,938,904 A | * | 8/1999 | Bader et al. | 204/450 |
| 5,976,336 A | * | 11/1999 | Dubrow et al. | 204/453 |
| 6,186,660 B1 | * | 2/2001 | Kopf-Sill et al. | 366/340 |
| 6,730,204 B2 | * | 5/2004 | Mariella, Jr. | 204/547 |
| 7,204,139 B2 | | 4/2007 | Takayama | |
| 7,223,607 B2 | | 5/2007 | Bryselbout | |
| 7,473,361 B2 | * | 1/2009 | Craighead et al. | 210/198.2 |

OTHER PUBLICATIONS

Pall Corporation. "Ultrafiltration Fundamentals." Available at <http://www.pall.com/34696_35486.asp> through <http://www.archive.org>, Mar. 15, 2005, p. 1-5.*
Blom et al., A Chip System for Size Separation of Macromolecules and Particles by Hydrodynamic Chromatography, 74, 3470-3475, Anal. Chem. 2002.

* cited by examiner

*Primary Examiner* — Krishnan S Menon
*Assistant Examiner* — Katherine Zalasky
(74) *Attorney, Agent, or Firm* — Lumen Patent Firm

(57) ABSTRACT

A method of using electrokinetics for separating particles in a buffer solution is provided, where a chromatographic column is provided having a non-uniform internal longitudinal cross-section. At least one main inlet for inputting solution and at least one main outlet for outputting solution are provided. At least one sample inlet and at least one sample outlet are provided. The particle is introduced to the column from the sample inlet and fractionated samples are eluted from the sample outlet, where quality control and further analysis are enabled. An electric field is applied to the solution in the column to generate a charged double layer at a solid-liquid interface within the column. The electric filed moves ions within the double layer, and a non-uniform velocity profile is induced to the buffer solution. The moving ions carry the particles along the column and the particles are separated according to size or charge.

8 Claims, 4 Drawing Sheets

(a)

(b)

(c)

METHOD OF SEPARATION OF POLYMERS

CROSS-REFERENCE TO RELATED APPLICATIONS

This application is cross-referenced to and claims the benefit from the U.S. Provisional Patent Application 60/912,681 filed Apr. 18, 2007, which is hereby incorporated by reference.

FIELD OF THE INVENTION

The invention relates generally to chromatography. More particularly, the invention relates to a method of separating charged and uncharged particles according to size.

BACKGROUND

Chemical mixture separation is important to many fields. While a variety of approaches exist for chemical separations, chromatography and electrophoresis are two of the most commonly used analytical methods.

Chromatography is a set of laboratory techniques used to separate constituents from a chemical mixture. Chromatography is used in everything from water and food safety to biotechnology and drug discovery. It is also a common technique used in standard laboratory procedures and cutting-edge scientific research, where liquid chromatography, size-exclusion chromatography, affinity chromatography and high-pressure liquid chromatography are traditionally used.

In liquid chromatography, the unknown sample is dissolved in a liquid mobile phase, which is then over a stationary phase. The analyte of interest remains with, or is slowed by, the stationary phase, separating it from the overall mobile phase mixture.

Liquid chromatography can be further divided by the stationary phase, comprising three methods: ion-exchange, size-exclusion, and affinity chromatography. In ion-exchange chromatography, the stationary phase contains charged functional groups, which interact with the charge on the analyte. This charge will affect the migration time through the chromatography system, separating the analyte from the overall sample.

Size-exclusion chromatography, or gel permeation chromatography, separates constituents based on size, passing the mobile phase through a porous medium that only passes particles below a certain size.

Affinity chromatography is based on selective covalent bonding with the mobile phase. For example, proteins or polymers tagged with a specific linker can be isolated with the appropriate linker analogue.

General improvements in liquid chromatography have increased the efficiency and resolution, leading to the more common description of high-pressure (or performance) liquid chromatography (HPLC). Such separations typically require macroscopic volumes of material—the mobile phase may be a few milliliters or more. Additionally, these separations can take hours to process. And, even with these drawbacks, the results are still rather crude single-monomer polymer separation across a broad stripe of analytes is a significant challenge.

An alternative to HPLC is electrophoresis, where charged molecules are separated in an electric field. FIG. 1 shows a prior art schematic illustration of electrokinetic flows 100. The electroosmotic 102 and electrophoretic 104 flows of particles 106 scale linearly with the electric field E by a mobility factor $\mu$ inside a channel 108, where the electric field is created by a voltage supply 110 across the length of the channel 108. The arrows are shown in opposite directions for illustration, where they may point in either direction depending on charges and material properties. This separation of the components of a mixture of charged molecules is an important scientific and technological process, including analytical methods such as DNA sequencing and preparative methods such as the purification of proteins. Successful separation of a mixture of polyelectrolytes by an applied electric field according to charge or mass depends on symmetry-breaking mechanisms between the driving force, related to the electric field, and the friction offered by the medium, such as a buffer solution with or without a matrix such as a gel. Accordingly, if the driving force and the friction force scale the same way with charge or length, the ratio of these quantities is then independent of charge or length, and separation is not achieved. There are many ways to achieve symmetry-breaking for polyelectrolytes such as DNA, ranging from the use of gel matrices for sequencing relatively short DNA fragments in a constant electric field, to pulsed-field gel electrophoresis for separating large DNA fragments, or to creating asymmetric molecules for separation in free solution.

There are multiple approaches to electrophoresis. Capillary electrophoresis separates components within a glass capillary. Here, the properties of microfluidic flow within such a capillary improve efficiency and reduce separation times. Known instruments can reduce the separation time to 30 minutes, while allowing the use of a few microliters of material. For fields where materials are expensive and rare, such as drug discovery, capillaries offer tremendous benefits.

Furthermore, in the last few years, microfabricated capillary electrophoresis devices have entered the market. These devices offer parallel processing with a few to dozens of simultaneous separations. Microfabricated devices also work with smaller sample sizes. These advantages are both increasingly important in biotechnology, as many samples are of limited material quantities. Commercial microfabricated capillary electrophoresis systems are being used for DNA sequencing, RNA analysis, protein separations, and even cell content studies.

The ability to separate a chemical mixture into constituents is absolutely necessary for all of analytical chemistry. Improvements in speed, quality, efficiency, or resolution of separation techniques are necessary enhance the behind-the-scenes laboratory work that ensures the quality of everyday products. These products can be categorized in the fields of pharmaceuticals, laboratory, environmental, food/beverage, and academic. Each of these segments has a broad impact across all of society, such as quality-control analysis, where imported food products must be analyzed for hazardous materials, or water and soil must be measured for pollutants before entering public consumption.

Many liquid chromatography methods are used in environmental analysis, such as water and soil quality analyses, where measuring organic compounds or mineral-content levels in water is handled by experienced lab technicians operating chromatography tools. These processes are expensive and time-consuming. Nevertheless, the application of chromatography in these fields is tremendous and pervasive. Thus, the broader impact of new techniques to speed and improve chemical separations is wide-ranging and important. While recent electrokinetic separations have improved separation speed and resolution for charged molecules over traditional chromatographic techniques, such improvements are still lacking for many particles including charged and uncharged molecules.

Capillary electrophoresis provides improvements in speed and resolution over LC. Furthermore, capillary electrophoresis works effectively in parallel systems and with microscopic volumes. When molecules are uncharged, electrophoretic methods have been ineffective, the options for separating such molecules are limited to older LC techniques, such as size-exclusion or affinity chromatography.

Uncharged polymers are important in many everyday products. For example, poly(ethylene glycol) is used in a multitude of medical applications: in laxatives, in skin creams and eye drops, and for delayed protein drug delivery. The polymer poly(vinyl alcohol) is used extensively in products ranging from children's putty to adhesives. Furthermore, under electrophoretic conditions, free-draining coils, such as DNA, are effectively uncharged as their drag-to-charge ratio is uniform, where DNA will not separate in an electric field without a symmetry-breaking mechanism. Additionally, many proteins and peptides are effectively uncharged; electrophoretic separation of these important biomaterials is not possible with additional processing steps. As uncharged polymers are necessary components of everyday materials, improved separations of these materials will improve the safety and quality of these products.

Accordingly, there is a need to develop a low-cost technique for separating charged and uncharged particles, where the method has broad applications in environmental, biotechnological, and chemical processing.

SUMMARY OF THE INVENTION

To meet the shortcomings in the current art, a method of using electrokinetics for separating particles in a buffer solution is provided. The method includes providing a chromatographic column, where the column has a non-uniform internal longitudinal cross-section. The method further includes providing at least one main inlet and at least one main outlet, where the solution is input to the main inlet and output from the main outlet. At least one sample inlet and at least one sample outlet are provided, where the particle is introduced to the column from the sample inlet and fractionated samples are eluted from the sample outlet, whereby quality control and further analysis are enabled. An electric field is applied to the solution in the column to generate a charged double layer at a solid-liquid interface within the column, where the electric filed moves ions within the double layer, and a non-uniform velocity profile is induced to the buffer solution, where the moving ions carry the particles along the column and the particles are separated according to size or charge.

According to one embodiment of the invention, the non-uniform internal longitudinal cross-section has a generally counter undulating-shape profile, where the counter undulation is between a first wall cross-section and a second wall cross-section. According to one aspect of the current embodiment, the undulation has a peak to peak distance in a range from 1 μm to 500 μm. In a further aspect of the current embodiment, the undulation has an undulation linear density ranging from 0.05 peaks/μm to 1 peak/μm. In yet another aspect, the undulation first wall cross-section and the second wall cross-section have a ratio of a widest separation and a narrowest separation that is greater than or equal to one.

In one aspect of the invention, the column has a shape that can be linear, curved, circular, or spiral.

In another aspect of the invention, the particles can be uncharged particles or charged particles.

In a further aspect of the invention, the solution can be water, phosphate buffered saline, TTE (0.5 M Tris, 0.5 M TAPS, 0.02 M EDTA) or any water-based solution.

In another aspect, the particles have a particle size ranging from 1 nm to 500 μm.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

A new technique for separating uncharged and charged particles is provided, where the method has broad applications in environmental, biotechnological, and chemical processing. An electrokinetic approach is provided for the separation of uncharged polymers. Typically, uncharged molecules, such as certain peptides, proteins, and commercially important polymers, are not influenced by an electric field, although they will interact with a moving buffer solution. When this moving buffer solution has a spatially uniform velocity profile, the uncharged molecules will not separate by length or size. Conversely, when the moving buffer solution has a non-uniform velocity profile, molecules can be separated based on size.

Figure 1:
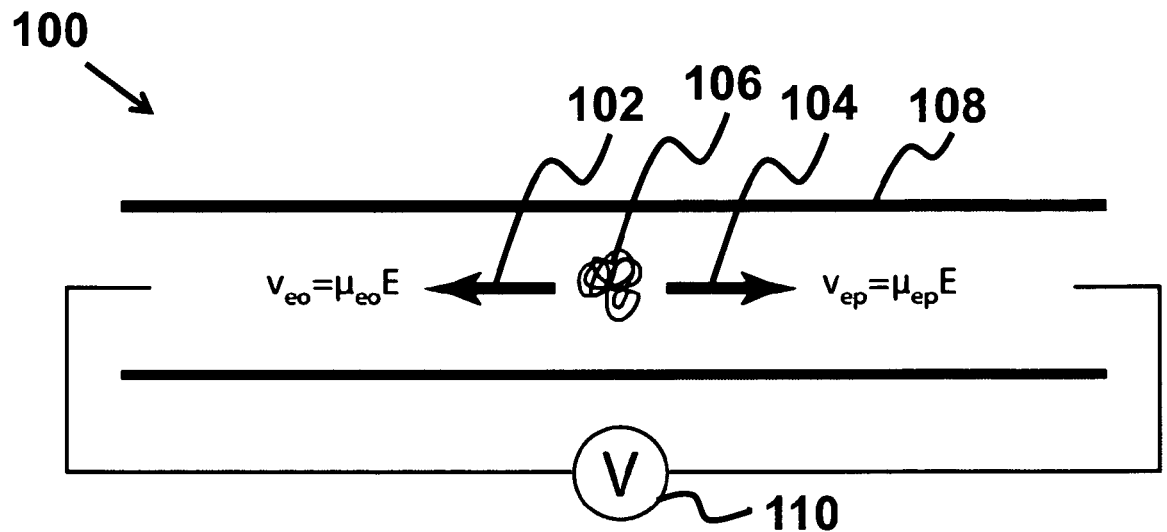
FIG. 1 shows a prior art schematic illustration of electrokinetic flows.
Figure 2:
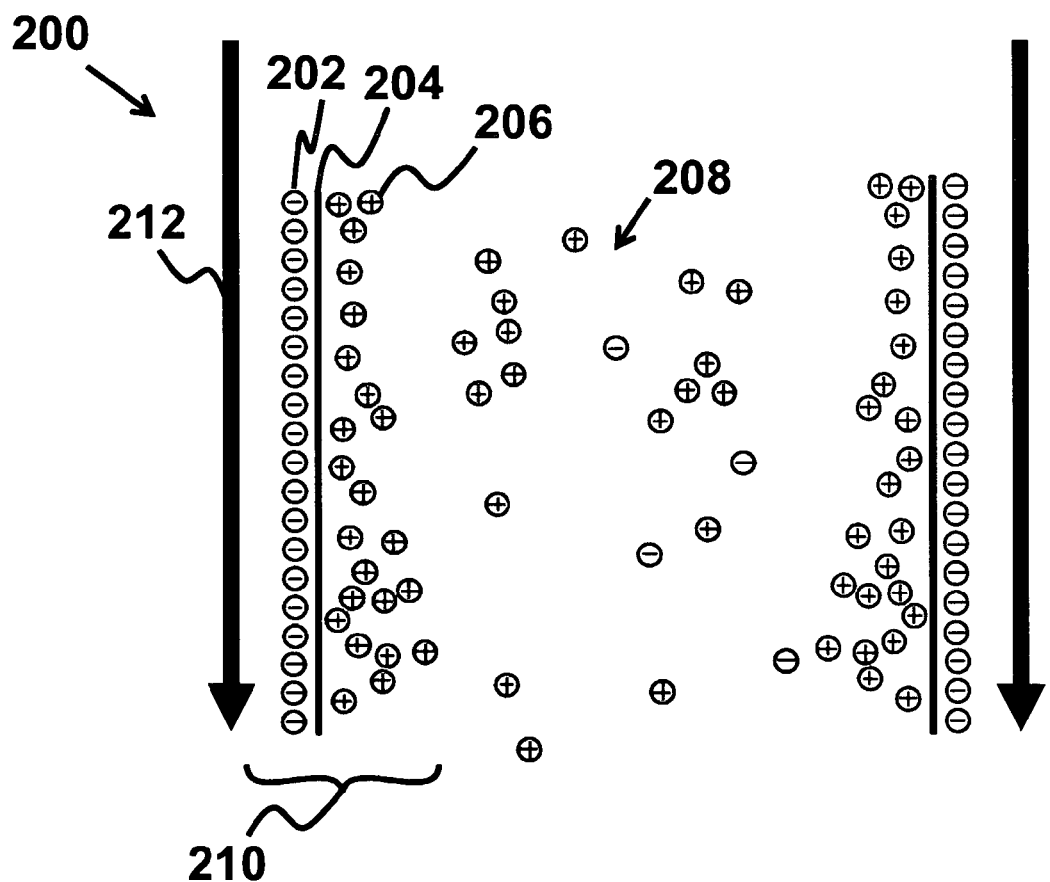
FIG. 2 shows an electric double layer leading to electroosmotic flow according to the present invention.

While an electric field does not affect uncharged molecules directly, it does give rise to a bulk flow of a buffer solution. This bulk fluid movement past a stationary solid surface, called electroosmosis, is due to the formation of a charged double layer at the solid-liquid interface. FIG. 2 shows a schematic drawing of an electric double layer providing electroosmotic flow 200. As shown a first charge layer 202 is fixed to channel wall surface 204, while the opposite charges 206 remain mobile in solution 208. At many liquid-solid interfaces, dissociated liquid ions, such as water ions, will interact with the solid surface, creating a charged double layer 210, where an applied electric field (not shown) is able to move the mobile ions 206 within the double layer 210, dragging the bulk solution 208 and any solvated molecules (not shown) along the microchannel 212. The solution can be water, phosphate buffered saline, TTE (0.5 M Tris, 0.5 M TAPS, 0.02 M EDTA) or any water-based solution.

According to the current invention, non-uniform electroosmotic flow provides separation of uncharged molecules in free solution. The current invention uses the properties of Brownian motion and how it affects the random motion of small molecules more than large molecules. Specifically, small molecules exhibit a higher probability of spending time away from the center of a channel having non-uniform electroosmotic flow than the large molecules, resulting in a longer average path length for the small molecules and contributing to a lower effective mobility. The current invention provides a method of enabling large molecules to exit the channel ahead of the small molecules, where the small molecules have a longer travel time through the channel.

As stated, a non-uniform electroosmotic flow is generated by varying the channel geometry along the x-axis, resulting in a distribution of velocities in the x-direction along the y-axis. As a particle moves along the y-axis, away from the center of the channel, the curved flow lines of the channel walls result in longer path lengths. Because the smaller molecules have a greater propensity to diffuse laterally, size-dependent separation occurs, where smaller molecules fall behind the larger molecules within the solution as they migrate along the column length. Conversely, the larger molecules tend to spend more time along the center of the channel and progress through the column at a faster rate.

Figure 3:
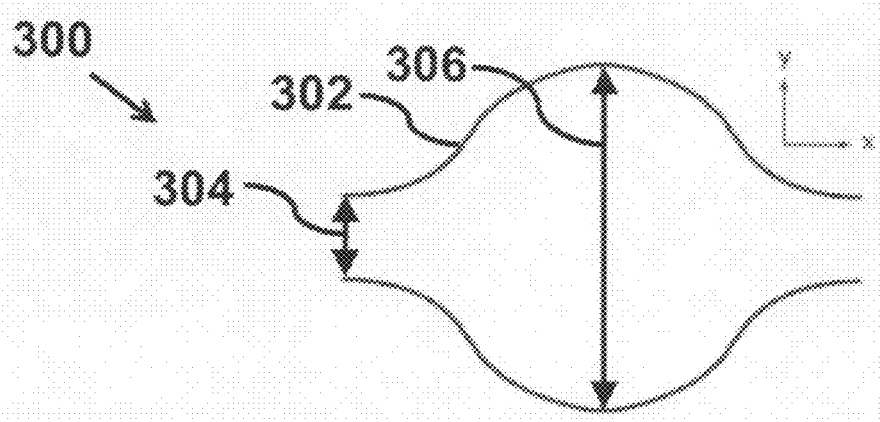
FIGS. 3a-3c show a channel geometry and flow diagram according to the present invention.
Figure 3:
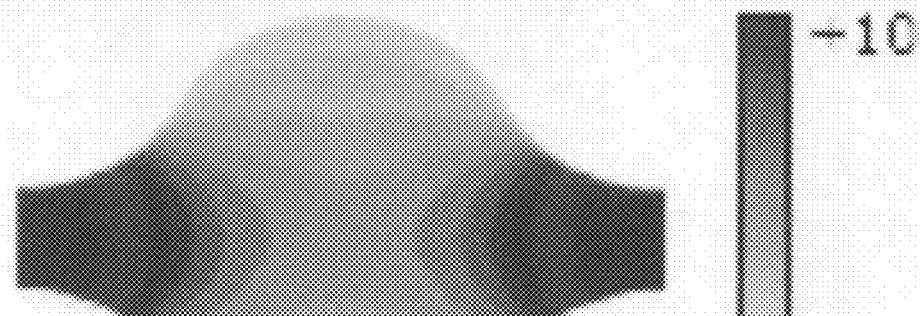
Figure 3:
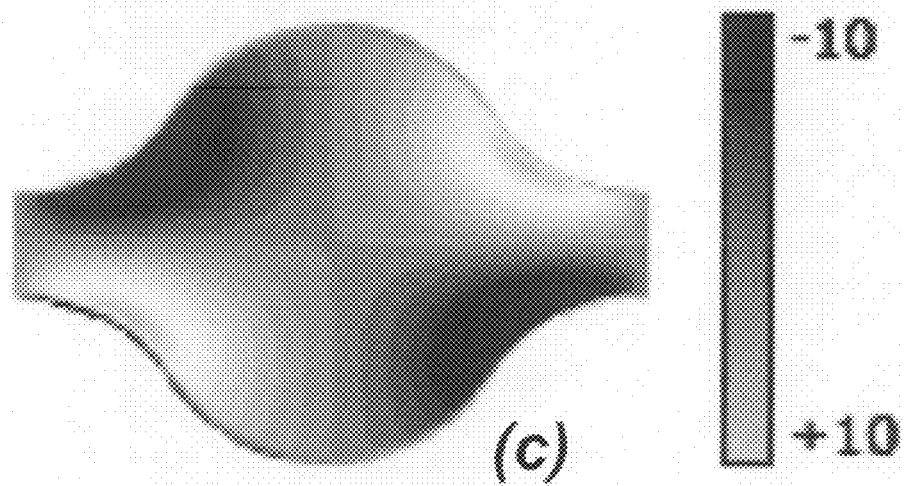

FIGS. 3a-3c show channel geometry and flow diagrams 300 according to one embodiment of the invention. FIG. 3a shows a non-uniform channel 302 having a narrow span 304 and a wide span 306, where a geometry parameter α is defined as the ratio of the widest 306 to narrowest 304 regions. Shown in FIGS. 3b and 3c are x-velocity and y-velocity results, respectively, from a finite element model. Here, Navier-Stokes and momentum conservation equations are used, and a force term is added due to the applied electric field, where ρ is the fluid density, v is the velocity, μ is the viscosity, κ is the Debye length, p is the pressure, $\in$ is the dielectric constant, ψ is the potential due to the electric double layer, and φ is the applied potential, giving:

$$\rho\left[\frac{\partial v}{\partial t} + (v \cdot \nabla)v\right] = -\nabla p + \mu \nabla^2 v + \varepsilon \varepsilon_0 \kappa^2 \psi \nabla \varphi$$

$$\nabla \cdot v = 0.$$

The total electric potential in the microfluid channel can be described as the sum of the electric double layer potential and the applied potential. The Debye-Hückel approximation is used to simplify the expression for ψ, allowing both electric potentials to be determined by Poisson's equation.

A commercial finite element analysis software package, FEMLAB, was used here and standard values for the density, dielectric constant, and viscosity of water, plus the Debye layer parameters ξ=−40 mV and κ=1.13 μm$^{-1}$. The solution was discretized on a 400×400 grid, and introduced into the polymer flow solver.

To demonstrate the efficacy of the current invention, the flow pattern was generated on four geometries. The flow for α=1.0, 1.9, 3.0, 4.1, and 7.0 were modeled, with each respective geometry repeated periodically. For each geometry parameter, the velocity was scaled at the channel center to the value for α=4.1. A parameter of unity corresponds to a constant flow rate across and along the entire channel, thus corresponding to a uniform electroosmotic flow.

The polymer flow was modeled in MATLAB, using an exemplary discrete, worm-like chain model. The model consists of N beads of radius a connected by N−1 springs. For N beads, with positions $r_i$, the equations of motion are given by:

$$\dot{r}_i = \sum_{j=1}^{N} \vec{D}_{ij}\vec{F}_j + \vec{N}_i(t).$$

This equation was solved directly by a second-order Runge-Kutta method for stochastic differential equations. All motion in the z-direction was set to zero. The force acting on each bead, $F_j$, has three components: the Stokes' force from the moving fluid with velocity $v_j$ at the bead position, and the inter-bead spring and bending potentials, as provided in Volkel and Noolandi.

The fluid velocity was taken from the finite element model, with linear interpolation from the output grid to the particle coordinates. The constants from these equations are: bond length, b=2a; persistence length, P=5b; and spring constant, h=100b. The terms Ni(t) are Gaussian-distributed random numbers with zero mean and variance.

$$\langle N_i(t)N_j(t')\rangle = 2k_b T \overline{D}_{ij} \delta(t-t').$$

The Ni terms were calculated at each time-step using a Cholesky decomposition. The self-diffusion terms of the diffusion tensor are given by Volkel and Noolandi. For bead-bead hydrodynamic interactions, the terms are given by the Rotne-Prager approximation. For each geometric parameter α, the strings were modeled at each of the lengths L=5, 10, 15, 20, 25, 30, and 40 beads.

The first observation is the final position of the polymers as a function of length and geometry. Uniform flow (i.e., α=1) results in longer polymers traveling slightly less distance than shorter polymers. In contrast, as the geometry parameter increases, the longer polymers travel farther, with increasing separation based on length.

Figure 4:
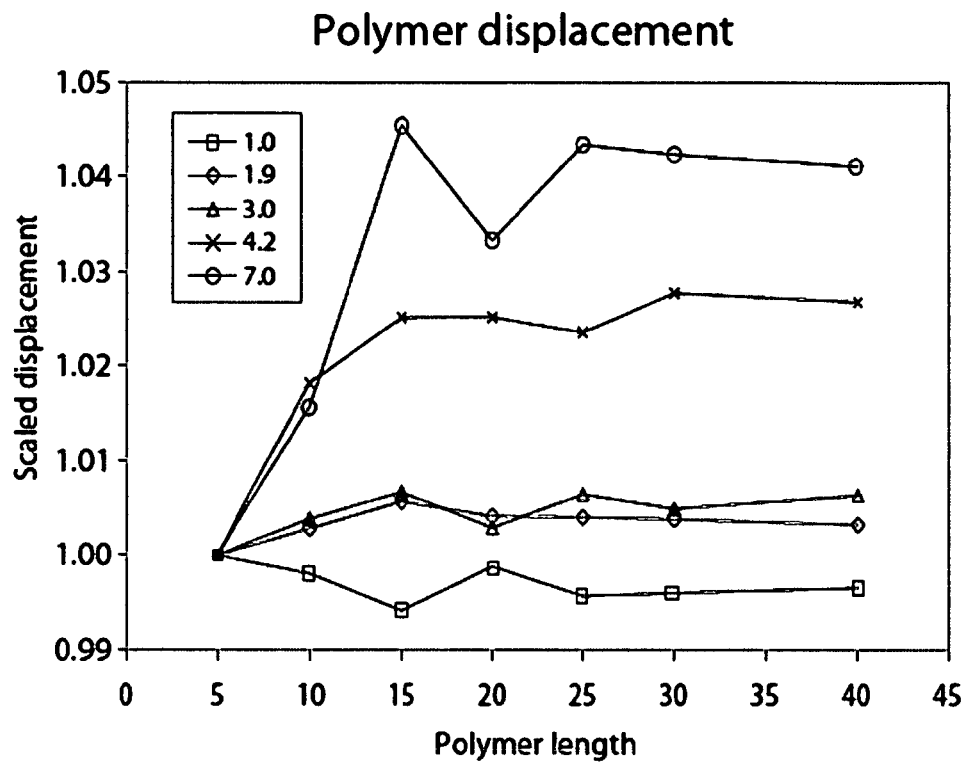
FIG. 4 shows numerical results on total polymer displacement of different channel geometries according to the present invention.

The position along the channel of representative polymers is illustrated in FIG. 4 that shows numerical results on total polymer displacement according to the current invention. For each geometry parameter, the symbol indicates the final position of the 5-bead string. While each geometry parameter results in the polymers moving different distances, the polymers end in regions with approximately the same velocity in the x-direction. Three representative flow lines are shown for α=4.1.

Note, in contrast to a uniform flow field, longer polymers travel further than shorter polymers, and as the geometry parameter increases, the travel distance between short and long polymers increases.

Additional data illustrating the effects of polymer length on displacement is presented in FIG. 4. For the largest geometry parameter, the difference in distance between a 5-bead string and a 40-bead string is nearly 5%. This difference contrasts with the uniform flow situation, where the distance difference is close to zero.

The current invention provides a novel and powerful technique for the separation of charged and uncharged polymers. Capillary electrophoresis enables faster, more accurate and smaller sample size analysis over high-pressure liquid chromatography, but it only works with charged molecules. The current invention, unlike capillary electrophoresis, provides analysis of both charged and uncharged molecules.

Separation of uncharged polymers, where longer uncharged polymers will travel further along a channel than short uncharged polymers in non-uniform electroosmotic flow, enables polymer discrimination to single monomer resolution, according to the current invention. Single-monomer resolution separation of a poly(ethylene glycol) mixture is of critical importance to commercialization; if the device cannot separate the polymers with high resolution, the usefulness decreases.

Figure 5:
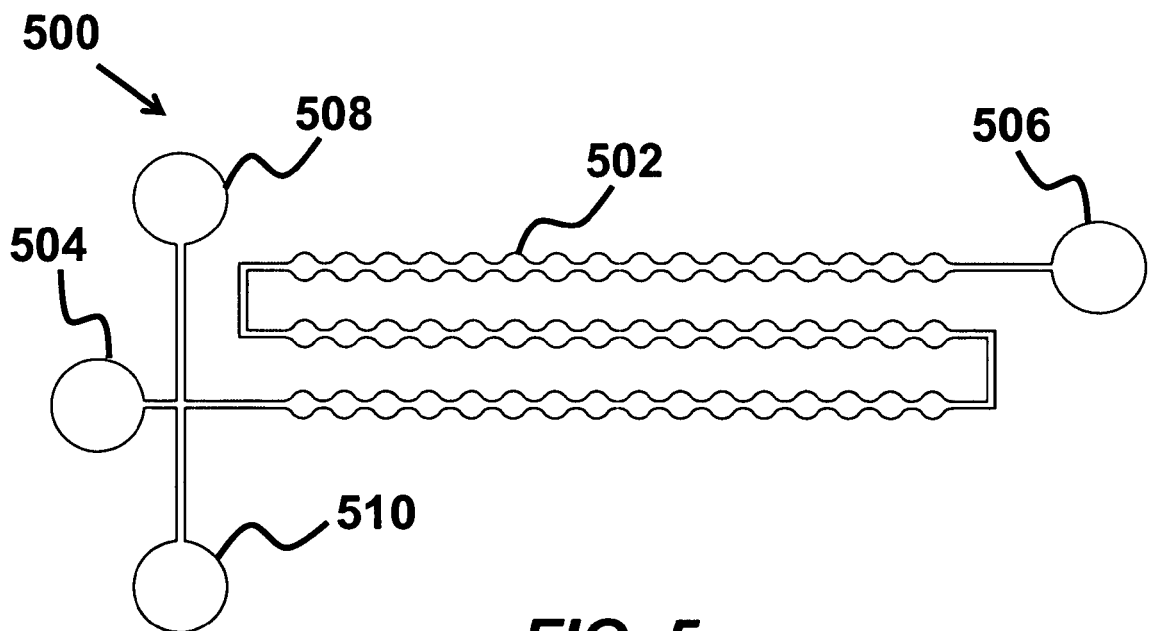
FIG. 5 shows a schematic of a device having a long region of undulary channels, coupled to inlet and outlet channels according to the present invention.

FIG. 5 shows a schematic of a device 500 having a long region of undulary channels 502, coupled to at least one inlet channel 504 and at least one outlet channel 506, according to the present invention. Sample insertion channels 508 are shown perpendicular to the inlet channel 504. A method of using electrokinetics for separating particles in a buffer solution is provided by the current invention. The column 502 has a non-uniform internal longitudinal cross-section, and the column can have a shape that can be linear, curved, circular, or spiral. At least one main inlet 504 and at least one main outlet 506 are provided, where the solution is input to the main inlet 504 and output from the main outlet 506. At least one sample inlet 508 and at least one sample outlet 510 are provided, where the particle (not shown) is introduced to the column 502 from the sample inlet 508 and fractionated samples are eluted from the sample outlet 510, whereby quality control and further analysis are enabled. An electric field is applied to the solution (see FIG. 7) in the column to generate a charged double layer (see FIG. 2) at a solid-liquid interface within the column, where the electric filed moves ions within the double layer, and a non-uniform velocity profile (see FIG. 3) is induced to the buffer solution, where the moving ions carry the particles along the column and the particles are separated according to size or charge.

According to one embodiment of the invention, the non-uniform channel 502 internal longitudinal cross-section has a generally counter undulating-shape profile, where the counter undulation is between a first wall cross-section and a second wall cross-section. The undulation can have a peak to peak distance in a range from 1 µm to 500 µm. Further, the undulation can have an undulation linear density ranging from 0.05 peaks/µm to 1 peak/µm. Further, the undulation first wall cross-section and the second wall cross-section have a ratio, or value of α with a widest separation and a narrowest separation that is greater than or equal to one.

In one exemplary aspect of the invention, the devices may be fabricated from glass wafers, such as Corning 7740. The surface chemistry of microfabricated glass devices is similar to capillaries, allowing the use of the same experimental techniques as used in capillary electrophoresis work. Other materials for electrophoresis can include molded plastic parts or other transparent wafers, such as quartz.

Figure 6:
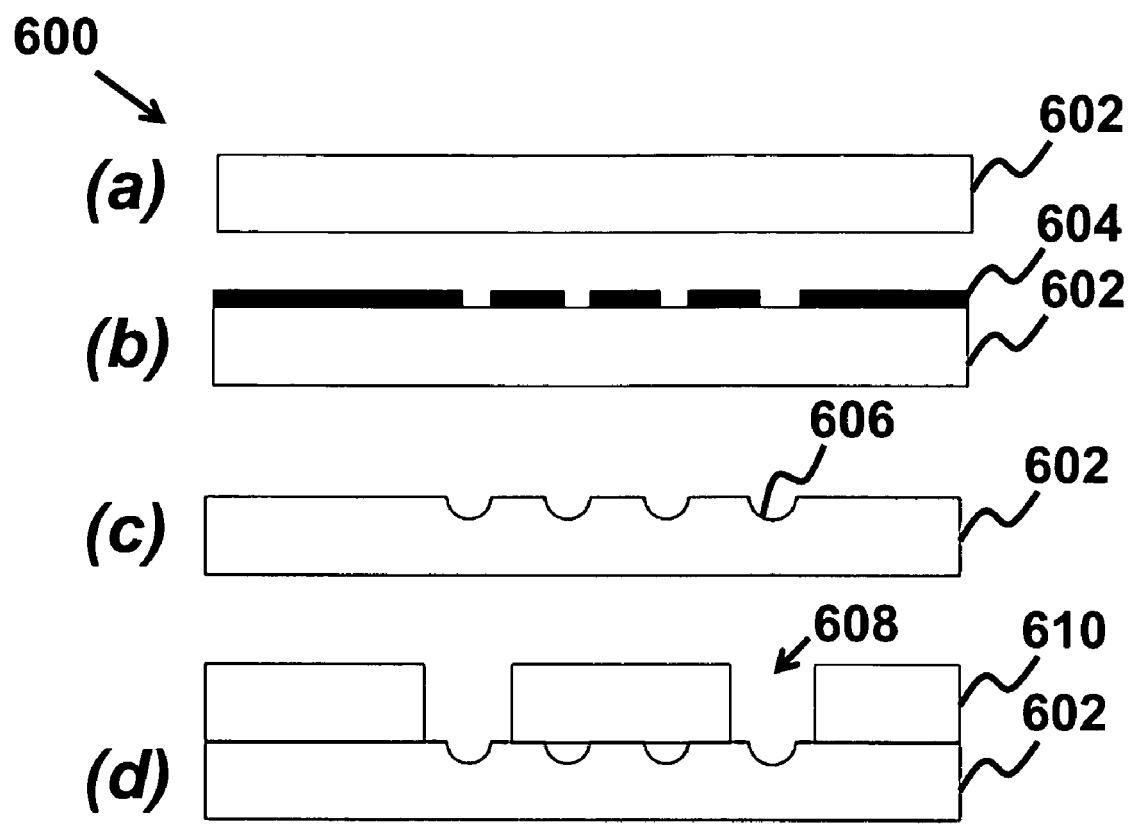
FIGS. 6a-6d show a process flow for fabricating a microfluid channel device according to the present invention.

FIGS. 6a-6d show a process flow for fabricating a microfluid channel device 600 according to the present invention. In FIG. 6a the process starts by providing a glass wafer 602 and applying a lithographic pattern photoresist 604 (see FIG. 6b) on the glass wafer 602. The wafers 062 are etched in a buffered oxide etch (see FIG. 6c), where the etched regions provide microfluidics channels 606. This etch is isotropic, creating half-cylindrical channels 606. A dry etch would result in a rectangular cross-section, if that were so required, according to one aspect of the invention. Access holes 608 are provided in a second glass-capping wafer 610 (see FIG. 6d). Once the wafers 602 are etched, the capping wafer 610 is aligned and thermally bonded thereto, according to one aspect of the invention. Unlike capillary electrophoresis, the current invention does not suppress electroosmosis, so internal channel coatings are unnecessary.

Figure 7:
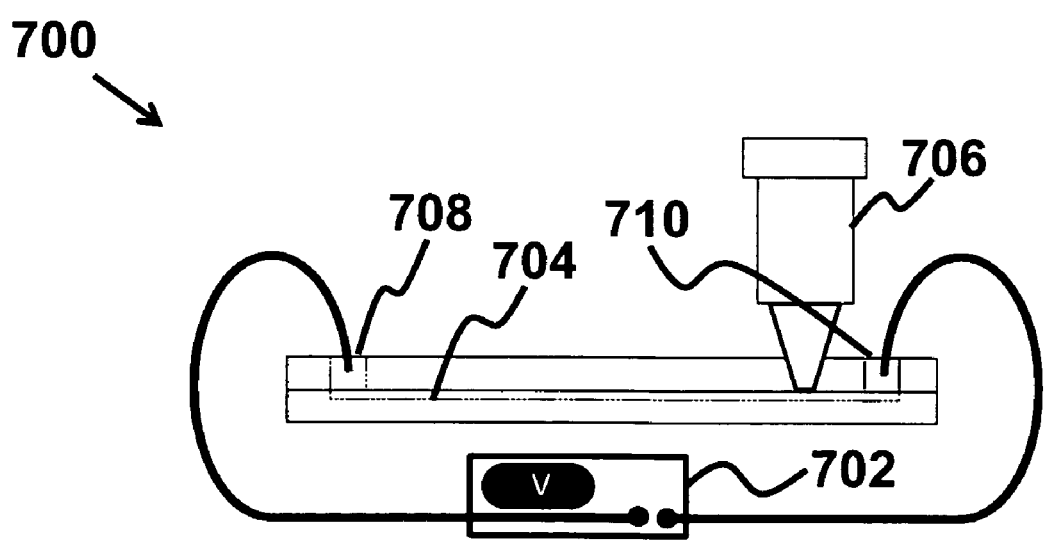
FIG. 7 shows a schematic drawing of a polymer separation apparatus according to the present invention.

FIG. 7 shows a schematic drawing of a polymer separation apparatus 700 according to one embodiment of the current invention. A high-voltage power supply 702 is used to drive the polymers (not shown) along the channel 704, while a fluorescence microscope 706 records the fluorescently-labeled polymers as they pass. It should be understood that there are numerous possible methods to identify and record the polymers within the apparatus, some examples include fluorescence, amperometry, color, or mass spectrometry which are embodied in the current invention.

As an example operation, a polymer containing solution is introduced to the main, undulary channel 704 (see FIG. 6 for example) from the side injection channel 708. A voltage is applied along the main channel 704, allowing the polymers to travel down the channel 704. A change in charge may affect the flow rate, which can effect the retention time. By normalizing to the flow rate, a normalized retention time becomes the same for each run. This information enables quantitative measurement of polymer length based on transit time, according to one aspect of the current invention. The particles can have a particle size ranging from 1 nm to 500 µm.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example channel shapes and sizes (heights, ratios), materials, electrode configurations, carrier solutions, fabrication methods can be varied without departing from the spirit of the invention.

All such variations are considered to be within the scope and spirit of the present invention as defined by the following claims and their legal equivalents.

What is claimed is:

1. A method of using electrokinetics for separating charged and uncharged particles in a buffer solution, the method comprising:

a. providing a chromatographic column, wherein said column comprises a channel having a continuously varying geometry along an x-axis, wherein said continuously varying geometry is disposed to provide a continuous distribution of velocities along a y-axis of said channel of a moving buffer solution, wherein said moving buffer solution moves in a continuous x-direction, wherein curved channel walls provide longer path lengths along said channel walls than path lengths along a center of said channel;

b. providing at least one main inlet and at least one main outlet, wherein said buffer solution is input to said main inlet and output from said main outlet;

c. applying an electric field to said solution in said column, wherein said electric field moves said buffer solution along said curved channel walls by electroosmosis, wherein a charged double layer is disposed at channel-buffer solution interface, wherein said charged double layer is disposed to drag said buffer solution along said curved channel walls in said continuous x-direction from said inlet to said outlet; and d. providing at least one sample inlet and at least one sample outlet, wherein said sample comprises charged and uncharged particles having varying sizes, wherein said uncharged particles are impervious to said electric field, wherein said curved channel walls are disposed to provide non-uniform flow of said buffer solution that moves in said continuous x-direction, wherein said non-uniform flow of said buffer solution moves said charged particles and said uncharged particles at different velocities along said curved channel walls in said continuous x-direction according to their charge and size along said column and said particles are eluted from said sample outlet according to size and charge.

2. The method of claim 1, wherein said channel having said continuously varying geometry along said x-axis comprises a generally counter undulating-shape profile, whereby said counter undulation is between a first wall cross-section and a second wall cross-section.

3. The method of claim 2, wherein said undulation has a peak to peak distance, wherein said peak to peak distance is in a range from 1 μm to 500 μm.

4. The method of claim 2, wherein said undulation has an undulation linear density ranging from 0.05 peaks/μm to 1 peak/μm.

5. The method of claim 2, wherein said undulation first wall cross-section and said second wall cross-section have a ratio of a widest separation and a narrowest separation, wherein said ratio is greater than or equal to one.

6. The method of claim 1, wherein said column has a shape selected from the group consisting of curved, circular, and spiral.

7. The method of claim 1, wherein said solution is selected from the group consisting of water, phosphate buffered saline, TTE (0.5 M Tris, 0.5 M TAPS, 0.02 M EDTA) and any water-based solution.

8. The method of claim 1, wherein said particles have a particle size ranging from 1 nm to 500 μM.

\* \* \* \* \*